United States Patent Office 3,545,978
Patented Dec. 8, 1970

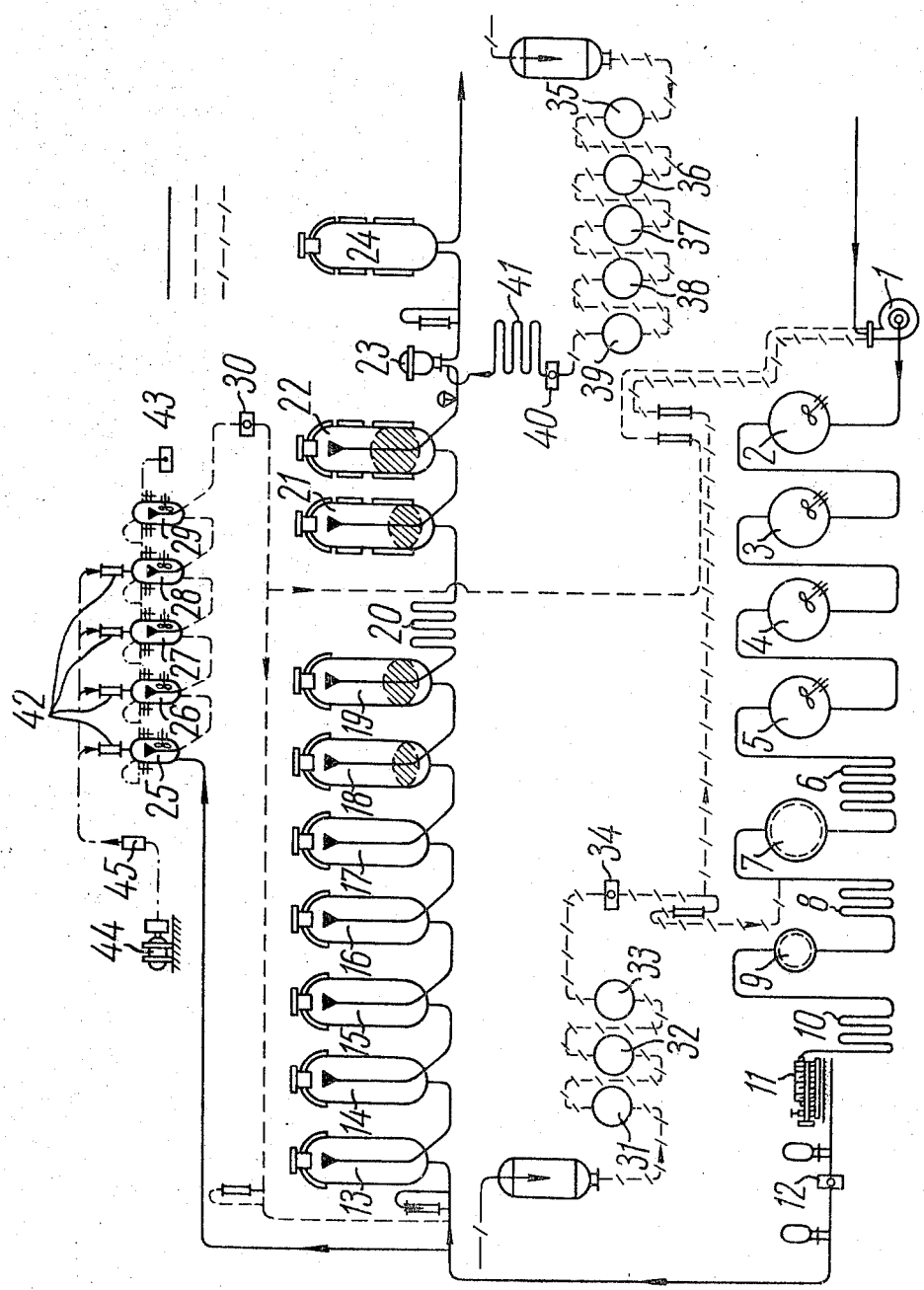

3,545,978
METHOD OF PRODUCING CHAMPAGNE
Georgy Gerasimovich Agabaliants, Ul. Aviamotornaya 51, kv. 36, Moscow, U.S.S.R; Artemy Arutjunovich Merzhanian, Ul. Novokuznechnaya 10, kv. 12, Krasnodar, U.S.S.R.; and Sergei Alexeevich Brusilovsky, Tsvetnoi bulvar 20, kv. 10; and Naskid Grigorievich Sarishvili, Proektirovanny proezd 2, korp. 4, kv. 52, both of Moscow, U.S.S.R.
Filed Feb. 28, 1967, Ser. No. 619,294
Int. Cl. C12g 1/06
U.S. Cl. 99—41                    1 Claim

ABSTRACT OF THE DISCLOSURE

A method and system for continuously producing champagne wherein deaeration of the wine blend is carried out in continuous flow, part of the flow being used as a nutrient medium for cultivating yeast which is carried out in continuous flow, said yeast flow being divided into two parts, one of which is added continuously to the wine blend before deaeration while the other part of the yeast flow is fed into the flow of blend before it undergoes secondary fermentation.

---

The present invention relates to the production of champagne and, more particularly, to a continuous flow method of producing champagne and a plant for accomplishing said method.

Known methods of producing bulk process champagne comprise the preliminary biological deaeration of the champagne wine blend by the batchwise addition of preliminarily prepared yeast culture and preliminarily prepared wine syrup, continuous secondary fermentation of the deaerated blend, cooling of the fermented blend, batchwise introduction of finishing wine syrup, batch ageing and filtration.

According to these known methods the continuous secondary fermentation of the champagne wine blend is carried out under constant pressure in a system of tanks connected in series to form a battery. Continuously operating plants for the production of champagne are, however, unknown.

Disadvantages associated with known methods of producing champagne are their low efficiency, the inevitable losses of champagne and lowering of quality, the need for large floor area, and low productivity.

It is the object of the present invention to provide a method of producing champagne insuring higher quality of the champagne obtained and elimination of champagne losses and wastes. It is another object of the invention to provide a continuous plant for the production of champagne making it possible to increase productivity and make rational use of floor area.

This object is accomplished by the provision of a method of producing champagne comprising the biological deaeration of champagne wine blend by the addition of yeast culture and wine syrup, secondary fermentation of the deaerated blend in continuous flow by the addition of yeast culture and wine syrup, followed by the cooling of the fermented blend, addition of finishing wine syrup, ageing and filtration.

In accordance with the invention, deaeration of the champagne wine blend is carried out in continuous flow, part of the flow being used as a nutrient medium for cultivating the yeast, which is likewise carried out in continuous flow, said yeast culture flow being divided into two parts, one of which is continuously added to the blend before it undergoes biological deaeration, at the beginning and end of which wine syrup is continuously added to the blend, while the other part of the yeast culture flow is fed into the flow of blend before it undergoes secondary fermentation. The fermented wine is subsequently aged in continuous flow with simultaneous cooling, after which it is filtered. Preliminary cooled finishing wine syrup should be added to the wine in continuous flow prior to filtration of said wine.

The plant for the realization of the present method, according to the invention, consists of sectional apparatuses for deaeration and secondary fermentatiton of the wine blend and for its ageing and filtration, for preparing fermentation and finishing wine syrup and for cultivating yeast, the outlet of the apparatus for cultivating yeast being connected to the inlet of the apparatus for secondary fermentation of the blend and the inlet of the apparatus for deaeration of said blend, the outlet of the apparatus for deaeration of the blend being likewise connected to the inlet of the apparatus for cultivating yeast, while the outlet of the apparatus for preparing fermentation wine syrup is connected to the inlet and outlet of the apparatus for deaeration of the blend.

The accompanying drawing shows schematically an embodiment of the method and plant of the present invention.

The plant consists of the following elements: a pump 1 for conveying champagne wine blend to the deaeration apparatus; a sectional apparatus for blend deaeration comprising series-connected tanks 2, 3, 4 and 5; a heat exchanger 6; a holding tank 7 for deaerated blend; a pasteurizer 8; a holding tank 9 for pasteurized blend; a heat exchanger 10; a filter 11; a dispensing pump 12; a sectional apparatus for secondary fermentation of blend, comprising series-connected tanks 13, 14, 15, 16, 17, 18 and 19; a heat exchanger 20; holding tanks 21 and 22; a filter 23; a receiving tank 24 for finished clarified champagne; a sectional apparatus for cultivating yeast comprising series-connected tanks 25, 26, 27, 28 and 29; a yeast pump 30; a sectional apparatus for preparing fermentation wine syrup comprising series-connected tanks 31, 32 and 33; a fermentation wine syrup pump 34; a sectional apparatus for preparing finishing wine syrup comprising series-connected tanks 35, 36, 37, 38 and 39; a dispensing pump 40; and a heat exchanger 41.

Champagne wine blend (coupage) is conveyed by pump 1 to the sectional apparatus for its deaeration. Into the intake line of pump 1 are injected, at preset flow rates, yeast starter in an amount of 2–3% and wine syrup in an amount sufficient to give a sugar content of 0.2–0.3% in the blend. As the blend passes through tanks 2, 3, 4 and 5 it is deoxygenated, i.e., deaerated as a result of the yeast multiplication.

For a uniform mixing of the blend (dispersion of the yeast cells), stirrers are provided in tanks 2, 3, 4 and 5. The deaerated blend is then subjected to heat treatment, being warmed to 40–50° C. in heat exchanger 6 and held at that temperature for 24–48 hrs. in tank 7. The blend is then conveyed to pasteurizer 8 at whose inlet it is continuously mixed with wine syrup to bring the sugar content in the blend up to 2–3%. After being heated to 60–70° C., the blend is held in flow in tank 9 for two hours, and then cooled in heat exchanger 10 to the process temperature (10–12° C.). After passing through filter 11, the blend is conveyed by dispensing pump 12 to the sectional apparatus for secondary fermentation. By means of pump 30 yeast starter is continuously injected into the blend before it enters the apparatus for secondary fermentation. After the completion of secondary fermentation, the wine from tank 19 or from several apparatuses operating in parallel is united and sent to heat exchanger 20 for single-stage cooling to a temperature of minus 4–5° C. The wine then passes through holders 21 and 22, partially filled like tanks 18 and 19 with polyethylene, porcelain, ceramic or other packing material. While passing in continuous flow through tanks 21 and 22, the wine is held at a temperature of minus 4–5° C. As the flow is subjected to secondary fermentation (champagnized) wine passes through the layer of packing, yeast cells, coloring matter, proteins and other substances which settle out during cooling and ageing are held on the surface of said packing. In special cases more or all of the tanks can be packed.

At the outlet from holding tank 22, finishing wine syrup preliminarily cooled in heat exchanger 41, from tank 39, is injected into the cooled champagne by means of dispensing pump 40.

The champagne then passes through filter 23 into receiving tank 24, from which it is bottled without filtration.

Yeast is cultivated in continuous flow, the nutrient medium being part of the deaerated champagne wine blend ready for secondary fermentation. Each apparatus for yeast cultivation is furnished with stirrers. The yeast culture is moved from tank to tank through downcomers mounted within each of tanks 25, 26, 27, 28 and 29. Aeration of the yeast culture is differentiated by installing a flow meter 42 on each tank except tank 29. Removal of excess air and evolved carbon dioxide is centralized, each tank being connected to a collecting main with a common hydraulic seal 43. The temperature in the last tank 29 is maintained not higher than the temperature in tank 19.

Air for aeration of the yeast culture is supplied by an air pump 44 through a filter 45.

Thus, the present invention provides for carrying out the process of continuous production of champagne from champagne wine blend, all preparatory and concluding stages of the process being carried out in continuous flow.

What is claimed is:
1. A method of producing champagne which comprises biologically deaerating champagne wine blend in continuous flow, carrying out secondary fermentation of the deaerated blend in continuous flow, cultivating yeast in continuous flow, the nutrient medium being part of said deaerated blend, dividing said yeast culture flow into two flows, one of which is continuously added to said blend being conveyed for deaeration and the other being continuously added to the deaerated blend being conveyed for secondary fermentation, adding fermentation wine syrup to the blend while said blend is being deaerated and to the deaerated blend being conveyed for secondary fermentation, ageing the champagne in flow with simultaneous cooling, adding preliminarily cooled finishing wine syrup to the aged champagne, and filtering the aged champagne in continuous flow.

References Cited

UNITED STATES PATENTS

| 3,062,656 | 11/1962 | Agabalianz et al. | 99—38X |
| 3,112,201 | 11/1963 | Saez | 99—41 |

OTHER REFERENCES

Ametine, M. A. Continuous Flow Production of Still and Sparkling Wine, Wines and Wines, vol. 40, No. 6, 1959 (pp. 41 and 42).

LIONEL M. SHAPIRO, Primary Examiner

D. M. NAFF, Assistant Examiner

U.S. Cl. X.R.
99—35